United States Patent [19]

Aimono

[11] Patent Number: 5,135,699
[45] Date of Patent: Aug. 4, 1992

[54] METHOD OF STAMPING MONOFILAMENT FOR SLIDE FASTENER COUPLING ELEMENTS

[75] Inventor: Sakae Aimono, Toyama, Japan

[73] Assignee: Yoshida Kogyo K. K., Tokyo, Japan

[21] Appl. No.: 660,002

[22] Filed: Feb. 25, 1991

[30] Foreign Application Priority Data

Feb. 26, 1990 [JP] Japan .................................. 2-44766

[51] Int. Cl.⁵ ............................................ B29C 43/22
[52] U.S. Cl. .................. 264/280; 264/210.2; 425/365; 425/394
[58] Field of Search ............... 264/280, 281, 282, 284, 264/285, 286, 287, 210.2; 425/363, 365, 394, 395, 814; 28/279

[56] References Cited

U.S. PATENT DOCUMENTS 2,689,977  9/1954  Hubmann ........................... 425/365
4,494,922  1/1985  Fukuroi et al. .................. 425/324.1

FOREIGN PATENT DOCUMENTS 44-24347  10/1969  Japan .
63-8902   2/1988   Japan .

*Primary Examiner*—Jill L. Heitbrink
*Attorney, Agent, or Firm*—Hill, Van Santen, Steadman & Simpson

[57] ABSTRACT

A method for stamping a monofilament between a pair of mating stamping rollers to form shaped portions for slide fastener coupling elements includes using an annular outer roller and a cylindrical inner roller with pressing projections on a mating stamping surface of at least one of the rollers. The rollers are positioned in such an arrangement that an outer circumferential surface of the cylindrical inner roller mates partially with an inner circumferential surface of the annular outer roller. The rollers are rotated in a common direction, and monofilament is supplied continuously to an area where an inner circumferential surface of the annular outer roller and an outer circumferential surface of the cylindrical inner roller mate. The monofilament is thereby pressed for a longer time in order to form accurately coupling head portions of slide fasteners.

1 Claim, 5 Drawing Sheets

METHOD OF STAMPING MONOFILAMENT FOR SLIDE FASTENER COUPLING ELEMENTS

BACKGROUND OF THE INVENTION

1. Field of the Invention

This invention relates to a method for stamping a monofilament of synthetic resin for slide fastener coupling elements, and more particularly to a stamping method for continuously providing on the monofilament coupling head portions, leg turnover portions, deformed portions facilitating bending, grooves receptive of sewing threads, etc. of slide fastener coupling elements.

2. Description of the Related Art

A method for stamping a monofilament of synthetic resin for slide fastener coupling element is known from, for example, Japanese Patent Publications 24347/1969 and 8902/1988. In the known method, as shown in FIG. 12 of the accompanying drawings, a monofilament E is continuously stamped by a pair of rotating rollers A, B having circumferential stamping teeth projections C, D as the monofilament E is supplied between the two rollers A, B.

However, in this prior art method, since the stamping teeth bite into the monofilament abruptly, cracks tend to develop in shaped portions. And since the molding teeth are separated from the monofilament suddenly after having compressed the monofilament, the pressing time is not sufficient to cure the individual shaped portion in a correct contour. Therefore it is difficult to obtain the shaped portions always with accuracy.

SUMMARY OF THE INVENTION

It is therefore an object of this invention to provide a method for stamping a monofilament of synthetic resin so as to have shaped portions, such as coupling head portions, leg turnover portions, deformed portions facilitating being, grooves receptive of sewing threads of slide fastener coupling elements, with precision.

According to this invention, there is provided a method for stamping a monofilament, between a pair of mating stamping rollers, to form shaped portions for slide fastener coupling elements, comprising: using an annular outer roller and a cylindrical inner roller for the pair of mating stamping rollers, respectively; positioning the annular outer roller and the cylindrical inner roller in such an arrangement that an outer circumferential surface of the cylindrical inner roller mates partially with an inner circumferential surface of the annular outer roller; rotating the annular outer roller and the cylindrical inner roller in a common direction; and supplying the monofilament to such mating areas of the outer and inner circumferential surfaces continuously while the outer and inner rollers are being rotated.

The above and other advantages, features and additional objects of this invention will be manifest to those versed in the art upon making reference to the following detailed description and the accompanying drawings in which several preferred embodiments incorporating the principle of this invention are shown by way of illustrative examples.

BRIEF DESCRIPTION OF THE INVENTION

FIGS. 1(a) and 1(b) are fragmentary schematic views showing the manner in which a monofilament is stamped according to a first embodiment of this invention;

Figure 6:
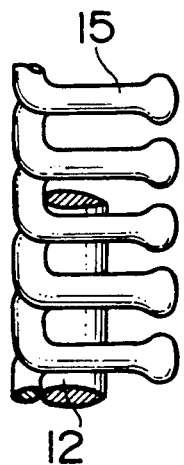
Figure 5D:
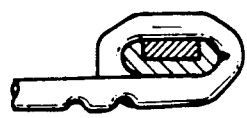
Figure 5E:
Figure 7:
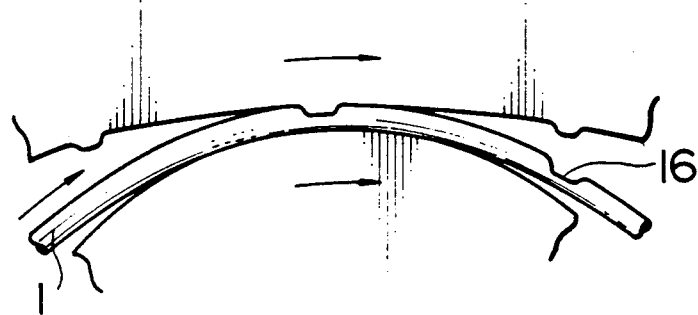
Figure 8:
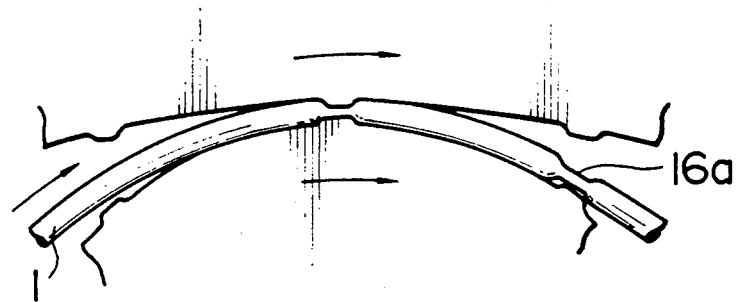
Figure 9:
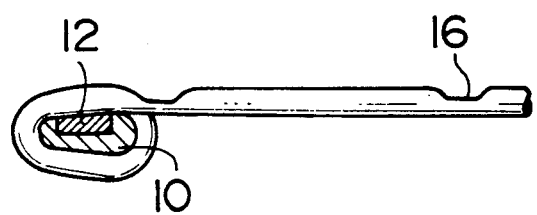
Figure 10:
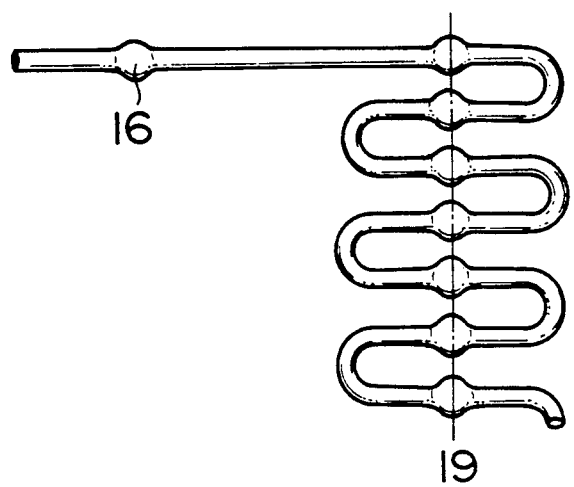
Figure 11:
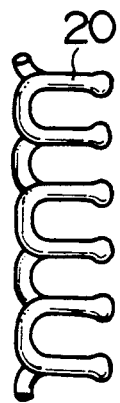

FIGS. 5(a) through 5(e) show the manner in which the shaped monofilament is progressively wound around a mandrel to form coiled coupling elements;

FIG. 6 is a fragmentary plan view showing the finished coiled coupling elements;

FIG. 7 is a fragmentary schematic view showing a third embodiment;

FIG. 8 is a view similar to FIG. 7, showing a fourth embodiment;

FIG. 9 shows the manner in which a monofilament shaped according to the third embodiment of FIG. 7 is wound around a mandrel;

FIG. 10 shows the manner in which the shaped monofilament provided according to the invention is progressively formed into a meandering filamentary element;

FIG. 11 is a fragmentary plan view showing a finished zigzag element; and

Figure 12:
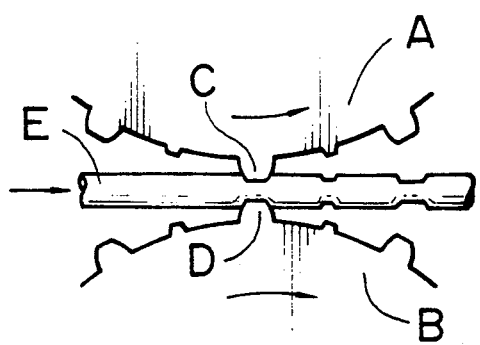

FIG. 12 is a fragmentary schematic view showing the manner in which a monofilament is stamped according to a prior art method.

DETAILED DESCRIPTION

Various embodiments of this invention will now be described with reference to the accompanying drawings.

Figure 1A:
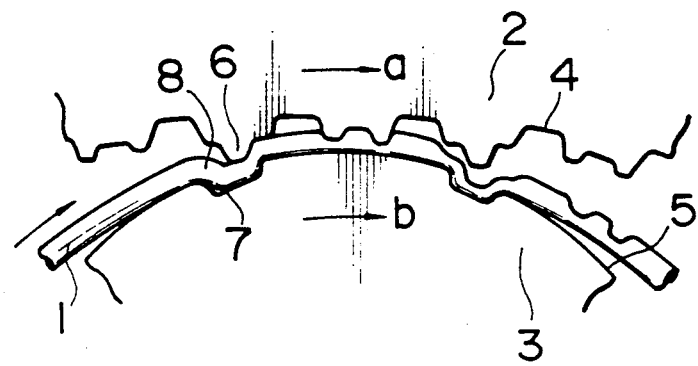
Figure 1B:
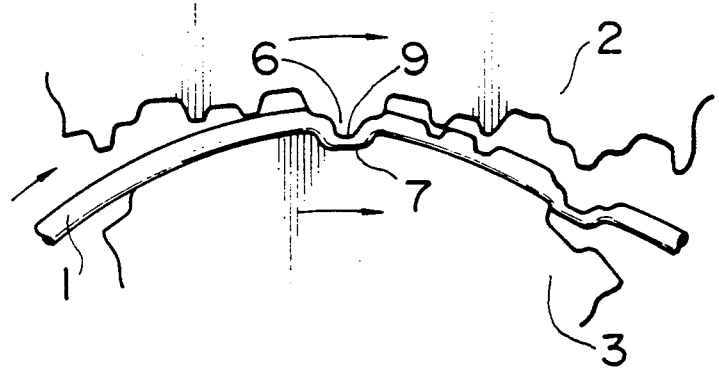

FIGS. 1(a) and 1(b) shows the manner in which a monofilamentary starting material (described below) is stamped by a pair of stamping rollers (described below), which is partially broken away, according to a first embodiment of the invention.

Figure 3:
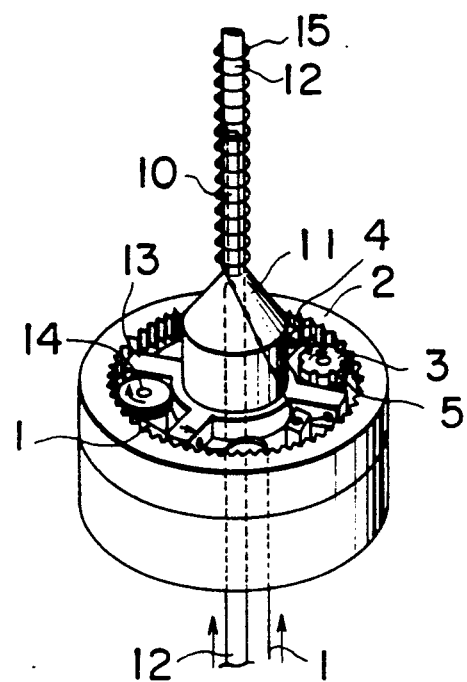
FIG. 3 is a perspective view, with parts omitted, of a coiled-coupling-element shaping apparatus for carrying out the invention.

In FIGS. 1(a) and 1(b), reference numeral 1 designates a starting material, for forming slide fastener coupling elements, in the form of a monofilament of thermoplastic synthetic resin such as polyamid or polyester. Semi-shaped portions of a prospective slide fastener coupling element, such as a coupling head portion, a leg turnover portion, a deformed portion facilitating bending, and a groove receptive of sewing thread, are successively formed on and along the monofilament 1 as the monofilament 1 is compressed between a pair of mating rotating stamping rollers 2, 3. As shown in FIG. 3, one of the stamping rollers 2 is an annular outer roller having on and around its inner circumferential surface 4 a predetermined number of pressing projections 6 at predetermined distances. The other roller 3 is a cylindrical inner roller having on and along its outer circumferential surface 5 a predetermined number of recesses 7 at predetermined distances. The pressing projections 6 cooperate with the corresponding recesses 7 to perform stamping.

Specifically, these two stamping rollers 2, 3 are positioned in such an arrangement that the inner circumferential surface 4 of the annular outer roller 2 is brought firstly gradually near the outer circumferential surface 5 of the cylindrical inner roller 3 toward the climax point (center of the mating areas of the inner and outer circumferential surfaces 4, 5) and then gradually away from the outer circumferential surface 5 as the outer and inner rollers are rotated in the same direction. While the two stamping rollers 2, 3 are being rotated in the same direction, i.e. clockwise as indicated by arrows a, b in FIGS. 1(a) and 1(b), the monofilament 1 is continuously supplied to the mating areas between the two rollers 2, 3 so that various semi-shaped portions of a prospective slide fastener coupling element are formed on the monofilament 1 by the pressing projections 6 and the coacting recesses 7.

Since the two stamping rollers 2, 3 are located in this arrangement, the pressing projections 6 are progressively brought toward the coacting recesses 7 as the two rollers 2, 3 rotate in the same direction. During that time, the individual semi-shaped portion 8 of the monofilament 1 is progressively formed as shown in FIG. 1(a) and is then completely compressed into a final shape 9 as the pressing projection 6 and the coacting recess 7 come near each other at the climax point as shown in FIG. 1(b), whereupon the pressing projection 6 and the recess 7 are progressively separated away from each other to release the compressing force. Therefore cracks due to a sudden deformation would be prevented, and the curing or hardening time of the completely shaped portion 9 is increased.

Figure 2:
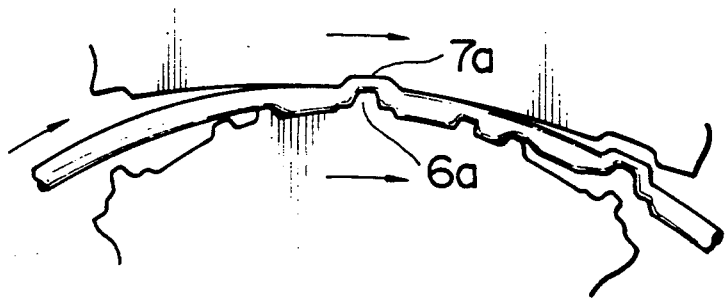
FIG. 2 is a view similar to FIGS. 1(a) and 1(b), showing a second embodiment of the invention.

The individual pressing projection 8 and the coacting recess 7 have such shapes as to form a coupling head portion, a leg turnover portion, a deformed portion facilitating bending, a groove receptive of a sewing thread, etc. of a prospective slide fastener coupling element. In this embodiment, the pressing projections 8 are disposed on the annular outer roller 2 while the recesses 7 are disposed on the cylindrical inner roller 3. Alternatively, the pressing projections 6a and the recesses 7a may be disposed reversely, i.e., on the cylindrical inner roller 3 and the annular outer roller 2, respectively, as shown in FIG. 2.

FIG. 3 shows one example of a coiled-coupling-element shaping apparatus for carrying out the method of this invention. A mandrel holder 11 is non-rotatably mounted at the center of the apparatus, and a mandrel 10 is fixedly attached on the top of the mandrel holder 11 so that the shaped monofilament is advanced upwardly as bent and wound around the mandrel 10 and thus shaped into coiled coupling elements 15. As shown in FIG. 5, the mandrel 10 has therein a passageway through which a core cord 12 is to be supplied.

A rotary member 13 is disposed about the base of the mandrel holder 11 and is adapted to be rotated, in a direction indicated by an arrow, by a suitable drive means. A pulley 14 for supplying the monofilament 1 is disposed inside the rotary member 13 at a position symmetrical to, i.e., diametrically opposite to the cylindrical inner roller 3. As the rotary member 13 is rotated, the cylindrical inner roller 3 and the pulley 14 are revolved about the mandrel holder 11 and are rotated on their own axes, thereby bending and winding the shaped monofilament 1 around the mandrel 10. The annular outer roller 2 is disposed around the rotary member 13; the cylindrical inner roller 3 is located relative to the annular outer roller 2 in such a manner that the outer circumferential surface 5 of the inner roller 3 is near the inner circumferential surface 4 of the outer roller 2 to stamp the monofilament 1.

In operation, the annular outer roller 2 and the rotary member 13 are rotated in such a manner that the rate of rotations of the annular outer roller 2 is slightly smaller lower than that of the rotary member 13. And while the rotary 13 makes one complete revolution about the mandrel holder 11, the cylindrical inner roller 3 and the pulley 14 are rotated on their own axes in such a manner that the circumferential speed of the pulley 14 meets with that of the inner circumferential surface of the annular outer roller 2. Meanwhile, the monofilament 1 is positively supplied, in a predetermined tension, by a length equal to the distance between an adjacent pair of coupling head portions, namely, the length of a single coiled coupling element 15, during which time the monofilament 1 is stamped and is then wound around the mandrel 10 by a complete turn.

The stamping method of this invention may be carried out, continuously with shaping the monofilament into coiled coupling elements, in the coiled-coupling-element shaping apparatus of FIG. 3, or may be carried out, independently of the step of shaping the monofilament into coiled coupling elements, in a private stamping apparatus.

Figure 4:
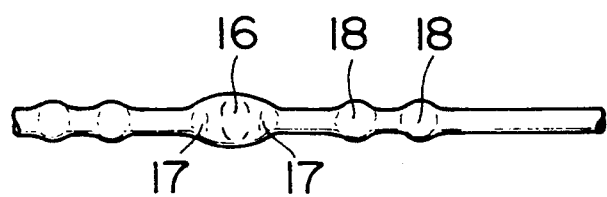
FIG. 4 is a plan view showing the monofilament and 1(b)
Figure 5A:
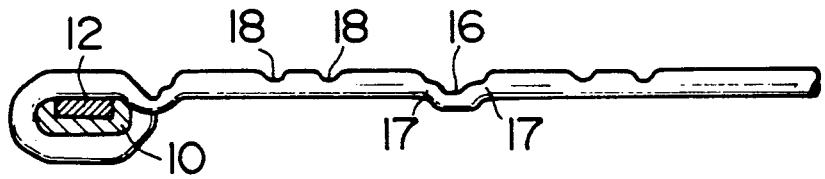
Figure 5B:
Figure 5C:
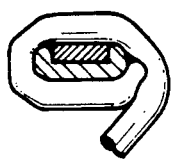

FIG. 4 shows the monofilament shaped according to the stamping method of this invention; FIGS. 5(a) through 5(e) show the sequence of steps in which the shaped monofilament is progressively wound around the mandrel 10 to provide the individual coiled coupling element; and FIG. 6 shows finished coiled coupling elements 15. The shaped monofilament of FIG. 4 has a coupling head portion 16, a pair of flattened portions 17, 17 facilitating bending at the side of the coupling head portion 16, and a pair of recess portions facilitating bending at the side of the leg turnover portion. This shaped monofilament is progressively bent and wound around the mandrel 10, in which a core cord 12 is received, as shown in FIGS. 5(a) through 5(e). With continued bending and winding, the shaped monofilament is formed into finished coiled coupling elements 15 shown in FIG. 6.

FIGS. 7 and 8 show third and fourth embodiments, respectively, of the stamping method of this invention in which a monofilament is stamped so as to have only coupling head portions 16 or 16a. FIG. 9 shows the manner in which the shaped monofilament of FIG. 7 is wound around a mandrel 10 to form coiled coupling elements.

FIG. 10 shows the manner in which the shaped monofilament having only coupling head portions 16 is bent at regular distances in a meandering pattern such that each coupling head portion 16 is disposed centrally between a pair of adjacent turnover portions on opposite sides and such that the successive coupling head portions 16 are arranged on an imaginary bending line 19 (described below). This meandering monofilament is folded over itself by bending along the bending line 19, thereby providing finished zigzag coupling elements 20 shown in FIG. 11.

According to this invention, partly since the inner circumferential surface of the annular outer roller and the outer circumferential surface of the cylindrical inner roller are curved in a common direction, and partly since as the outer and inner rollers are rotated in the same direction, the inner and outer circumferential surfaces are brought firstly gradually near each other toward the climax point and secondly gradually away from each other from the climax point, the supplied monofilament can be gradually stamped without causing cracks in the stamped and thus shaped portions. And after passing the climax point, the shaped portions can be gradually separated from the shaping teeth, and therefore, the entire pressing time can be increased to minimize chances that the shaped portions would be adversely deformed. Therefore, by the stamping method of this invention, it is possible to form on the monofilament various shaped portions, such as a coupling head portion, with accuracy.

What is claimed is:

1. A method for stamping a monofilament, between a pair of mating stamping rollers, to form shaped portions for slide fastener coupling elements, comprising:
   (a) using an annular outer roller and a cylindrical inner roller with pressing projections on a mating stamping surface of at least one of said rollers for the pair of mating stamping rollers, respectively;
   (b) positioning said annular outer roller and said cylindrical inner roller in such an arrangement that an outer circumferential surface of said cylindrical inner roller mates partially with an inner circumferential surface of said annular outer roller;
   (c) rotating said annular outer roller and said cylindrical inner roller in a common direction; and
   (d) supplying the monofilament continuously to an area where an inner circumferential surface of said annular outer roller and an outer circumferential surface of said cylindrical inner roller mate while said outer and inner rollers are being rotated.

* * * * *